No. 756,009. PATENTED MAR. 29, 1904.
M. FLEGLE.
FISH HOOK.
APPLICATION FILED AUG. 17, 1903.
NO MODEL.
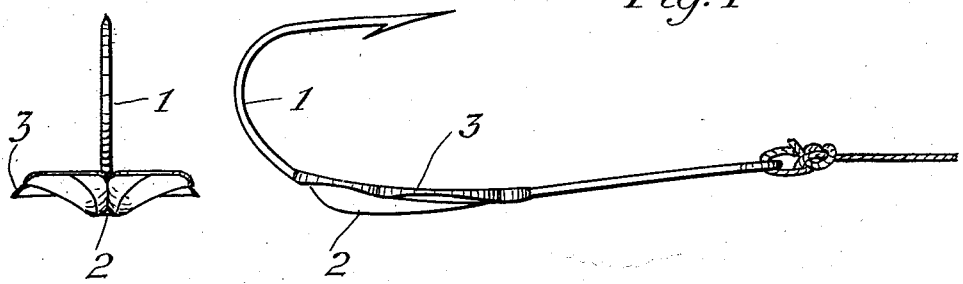
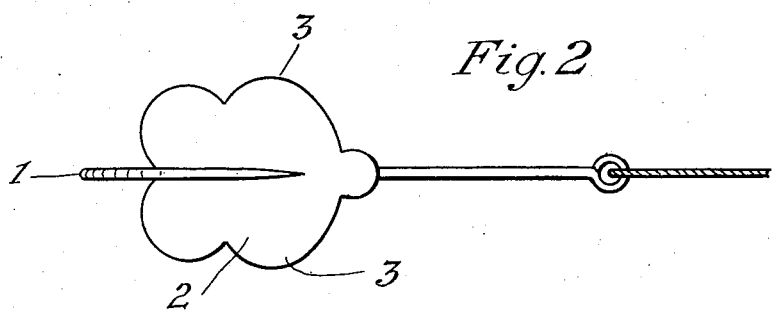
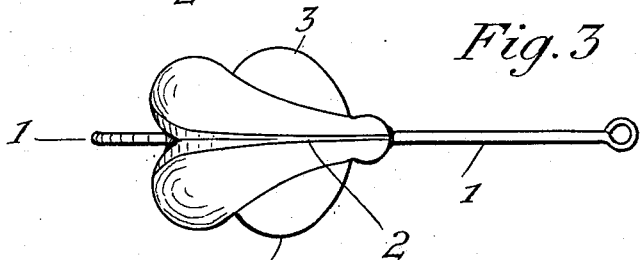
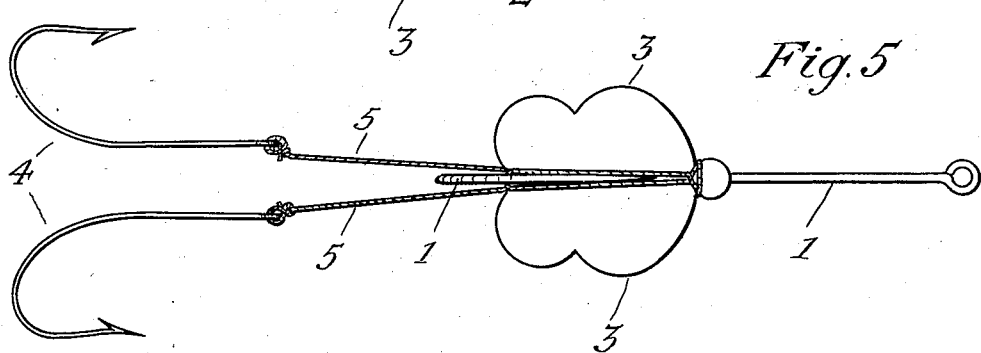
Witnesses:
H. A. Bowman.
Gertrude Taylor.
Inventor:
Martin Flegle
P. H. Gunckel
By
his Attorney.

No. 756,009.

Patented March 29, 1904.

UNITED STATES PATENT OFFICE.

MARTIN FLEGLE, OF MINNEAPOLIS, MINNESOTA.

FISH-HOOK.

SPECIFICATION forming part of Letters Patent No. 756,009, dated March 29, 1904.

Application filed August 17, 1903. Serial No. 169,834. (No model.)

*To all whom it may concern:*

Be it known that I, MARTIN FLEGLE, a citizen of the United States, residing at Minneapolis, county of Hennepin, and State of Minnesota, have invented certain new and useful Improvements in Fish-Hooks, of which the following is a specification.

My invention relates to fish-hooks used either with natural or artificial bait.

One of the objects of the invention is to produce a hook the point of which will be maintained in the water in position above the shank when the hook is moved, as in trolling or casting, for the purpose of keeping the bait in its natural position, with its back toward the surface.

Another object is to prevent the twirling of the hook, and thereby avoiding the twisting and kinking of the line.

Another object is to maintain the point in position where it is least liable to catch grass or other objects, and thereby enable successful fishing to be done among the lily-pads and in like places, where fishing is almost impossible with the ordinary hook.

A further object is to so shape the weight on the hook-shank that it may tend to keep the hook from sinking while the line is being moved and may at the same time serve as a lure or part of a lure. Such hook may be used for fishing with frogs, minnows, or other natural bait, or by attaching to its shank feathers or ribbons. It may be used to equal advantage with and as a part of an artificial bait. It may in either case have connected to it one or more trail or gang hooks.

My improvements are illustrated in the accompanying drawings, in which—

Figure 1 is a side view of my improved fish-hook. Fig. 2 is a top and Fig. 3 a bottom view of the hook shown in Fig. 1. Fig. 4 is a view from the left of Fig. 1 or Fig. 2. Fig. 5 shows the hook with a pair of gang-hooks attached to the principal hook.

In the drawings, 1 designates a fish-hook of any suitable size and shape. To its shank adjacent to the bend is secured the weight 2, which is preferably molded or formed, so as to embed that portion of the shank within the body of the weight. As to shape, the weight should have lateral or wing-like extensions 3, and its under side is preferably somewhat convexed and lengthwise corrugated, about as indicated in Figs. 3 and 4, in order that it may offer little resistance and tend to rise when drawn through the water.

I preferably employ in forming the weight an alloy composed of about two or three parts tin and one part lead in order that it may have sufficient weight and its surfaces retain their natural brightness in use. Other alloys than that named or other metals may be used, if desired, and the shape of the weight may be varied somewhat without changing the operation or usefulness of the device. In using a hook so constructed a minnow or frog may be hooked through the mouth and made to keep its natural position in the water in fishing by trolling or casting. Furthermore, as the point of the hook would be sustained toward the water's surface there would be little liability of its catching in the grass, rushes, or lily-pads, and this would be equally true if an artificial lure instead of a natural bait were used. To such hook may be connected one or more trailing or gang hooks 4, as illustrated in Fig. 5. The trailing hook or hooks can be hooked into the flanks of a frog or the body of a minnow or concealed within an artificial bait or lure. The trail-hook connections 5 may be made long enough to loop around the forward portion of the bait before the hooks are made to enter its body, and in this way the bait can be safely secured and prevented from being easily torn off by the fish.

Having described my invention, what I claim, and desire to secure by Letters Patent, is—

1. The combination with a fish-hook, of a weight in which its shank opposite its point is embedded, said weight having lateral wing-like extensions, substantially as set forth.

2. The combination with a fish-hook, of a weight in which its shank opposite its point is embedded, said weight having lateral wing-like extensions the surfaces of which are bright, substantially as set forth.

3. The combination with a fish-hook, of a weight in which its shank opposite its point is embedded, said weight having lateral wing-like extensions, and having its under surface convex and corrugated lengthwise, substantially as set forth.

In testimony whereof I have signed my name to this specification, in the presence of two subscribing witnesses, this 31st day of July, 1903.

MARTIN FLEGLE.

Witnesses:
P. H. GUNCKEL,
H. A. BOWMAN.